US012312213B2

(12) United States Patent
Bütler et al.

(10) Patent No.: US 12,312,213 B2
(45) Date of Patent: May 27, 2025

(54) UNIVERSAL CONSOLE AND PIT ASSEMBLY FOR A RAIL VEHICLE OF AN ELEVATOR SYSTEM, RAIL SYSTEM, AND METHOD FOR ALIGNING THE RAIL SYSTEM

(71) Applicant: Inventio AG, Hergiswil (CH)

(72) Inventors: Erich Bütler, Ebikon (CH); Romeo Lo Jacono, Gravesano (CH); Peter Möri, Rothenburg (CH)

(73) Assignee: INVENTIO AG, Hergiswil (CH)

(*) Notice: Subject to any disclaimer, the term of this patent is extended or adjusted under 35 U.S.C. 154(b) by 0 days.

(21) Appl. No.: 17/906,752

(22) PCT Filed: Mar. 22, 2021

(86) PCT No.: PCT/EP2021/057265
§ 371 (c)(1),
(2) Date: Sep. 20, 2022

(87) PCT Pub. No.: WO2021/191146
PCT Pub. Date: Sep. 30, 2021

(65) Prior Publication Data
US 2023/0174345 A1 Jun. 8, 2023

(30) Foreign Application Priority Data
Mar. 27, 2020 (EP) .................................... 20166320

(51) Int. Cl.
*B66B 7/02* (2006.01)
*B66B 19/00* (2006.01)

(52) U.S. Cl.
CPC ............ *B66B 7/027* (2013.01); *B66B 19/002* (2013.01)

(58) Field of Classification Search
CPC ....... B66B 7/027; B66B 7/024; B66B 19/002; B66B 7/02; B66B 7/023; G01C 15/10
See application file for complete search history.

(56) References Cited

U.S. PATENT DOCUMENTS 2,402,888 A * 6/1946 Harry .................... B66B 19/002 33/645
3,948,358 A * 4/1976 Atkey ........................ B66B 7/02 187/408
(Continued)

FOREIGN PATENT DOCUMENTS

CN 202245622 U 5/2012
CN 110325472 A * 10/2019 .............. B66B 7/00
(Continued)

OTHER PUBLICATIONS

Machine translation of the description of EP 0767134 A2 (Year: 1997).*

*Primary Examiner* — Minh Truong
*Assistant Examiner* — Michelle M Mudwilder
(74) *Attorney, Agent, or Firm* — William J. Clemens; Shumaker, Loop & Kendrick, LLP

(57) ABSTRACT

A universal bracket for a rail system includes a positionable and alignable main support and at least one mounting point for at least one rail of the rail system. The main support has two guides that are inseparably connected to the main support in order to guide one plumb bob in each case, the mounting point and the guides being arranged in fixed positions relative to one another.

10 Claims, 3 Drawing Sheets

(56) References Cited

U.S. PATENT DOCUMENTS

| | | | | |
|---|---|---|---|---|
| 4,593,794 | A * | 6/1986 | Russeau | B66B 19/002 52/745.2 |
| 5,520,264 | A * | 5/1996 | Korhonen | B66B 7/024 187/408 |
| 6,672,013 | B1 * | 1/2004 | Glassey | B66B 19/002 187/408 |
| 8,397,437 | B2 * | 3/2013 | Barneman | B66B 19/002 52/745.18 |
| 2003/0116386 | A1 | 6/2003 | Ach | |
| 2016/0311659 | A1 | 10/2016 | Mertala | |

FOREIGN PATENT DOCUMENTS

| | | | | |
|---|---|---|---|---|
| EP | 0767134 | A2 * | 4/1997 | |
| JP | H05139656 | A | 6/1993 | |
| JP | H05186161 | A | 7/1993 | |
| JP | H10218530 | A | 8/1998 | |
| JP | 2000118910 | A * | 4/2000 | B66B 19/002 |
| JP | 2001163549 | A | 6/2001 | |
| JP | 2002362850 | A * | 12/2002 | B66B 19/002 |
| JP | 2004256216 | A * | 9/2004 | B66B 19/002 |
| WO | 9840305 | A1 | 9/1998 | |
| WO | 2009156557 | A1 | 12/2009 | |
| WO | 2016066786 | A1 | 5/2016 | |

* cited by examiner

UNIVERSAL CONSOLE AND PIT ASSEMBLY FOR A RAIL VEHICLE OF AN ELEVATOR SYSTEM, RAIL SYSTEM, AND METHOD FOR ALIGNING THE RAIL SYSTEM

FIELD

The present invention relates to a universal console or bracket for a rail system of an elevator installation, to a pit assembly for a rail system of an elevator installation, to a rail system for an elevator installation, and to a method for aligning a rail system of an elevator installation in an elevator shaft for the elevator installation.

BACKGROUND

In an elevator installation, at least one car is guided by a rail system during the vertical motion thereof along an elevator shaft. The rail system comprises brackets that are fastened to walls of the elevator shaft for the elevator installation. These brackets are also sometimes referred to as cantilevers. Vertically arranged rails of the rail system are fastened to the brackets.

The brackets are fastened to the walls during a construction phase of the elevator installation, and then the rails are aligned relative to the brackets using an alignment apparatus. The alignment apparatus can be a plumb weight, for example, which is hung from a ceiling of the elevator shaft down into a pit of the elevator shaft. The rails can be aligned using templates or gauges that are held between the corresponding rail and a plumb line of the plumb weight. A position of the rail relative to the corresponding bracket is readjusted until the template or gauge fits exactly between the plumb line and the rail.

WO 2016/066786 A1 describes a conventional method for installing guide rails. WO 2009156557 A1 discloses an apparatus for aligning a plumb bob by means of actuators attached to the apparatus. JP H10 218530 A, JP 2001 163549 A, JP H05 186161 A, and JP H05 139656 A also disclose apparatuses that are temporarily attached in the shaft to hold or align a plumb bob.

SUMMARY

There may be a need for an improved universal bracket for a rail system of an elevator installation, for an improved pit assembly for a rail system of an elevator installation, for an improved rail system for an elevator installation, and for an improved method for aligning a rail system of an elevator installation in an elevator shaft for the elevator installation, among other things.

Such a need can be met by a universal bracket for a rail system of an elevator installation, by a pit assembly for a rail system of an elevator installation, by a rail system for an elevator installation, and by a method for aligning a rail system of an elevator installation in an elevator shaft for the elevator installation according to the advantageous embodiments that are defined in the following description.

According to a first aspect of the invention, a universal bracket for a rail system of an elevator installation is proposed, the universal bracket having a positionable and alignable main support and at least one mounting point for at least one rail of the rail system, the main support having two guides which are inseparably connected to the main support in order to guide one plumb bob in each case, the mounting point and the guides being arranged in fixed positions relative to one another.

According to a second aspect of the invention, a pit assembly for a rail system of an elevator installation is proposed, the pit assembly having a floor support and a fastening support aligned transversely to the floor support, the floor support having at least one mounting point for at least one rail of the rail system, and the fastening support having two fastening points connected inseparably to the fastening support in order to fasten one plumb bob in each case, the mounting point and the fastening points being arranged in fixed positions relative to one another.

According to a third aspect of the invention, a rail system for an elevator installation is proposed, the rail system having at least one universal bracket according to the approach proposed herein as a reference bracket, a pit assembly according to the approach proposed herein, at least one universal bracket according to the approach proposed herein as an intermediate bracket, and having at least one rail, the fastening points of the pit assembly being arranged under the guides of the reference bracket, and the guides of the intermediate bracket being aligned between the guides of the reference bracket and the fastening points of the pit assembly, the rail being mounted on the mounting points of the pit assembly, the intermediate bracket, and the reference bracket.

According to a fourth aspect of the invention, a method for aligning a rail system of an elevator installation in an elevator shaft for the elevator installation is proposed, a universal bracket according to the approach proposed herein being arranged as a reference bracket in the region of an upper end of the elevator shaft and being positioned and aligned on a wall of the elevator shaft, a first plumb bob being passed through the first guide of the reference bracket and lowered to a lower end of the elevator shaft, and a second plumb bob being guided through the second guide of the reference bracket and lowered to the lower end of the elevator shaft, a pit assembly according to the approach proposed herein being arranged at the lower end of the elevator shaft, the first fastening point of the pit assembly being positioned relative to the first plumb bob, and the second fastening point of the pit assembly being positioned relative to the second plumb bob, the first plumb bob being fastened to the first fastening point, and the second plumb bob being fastened to the second fastening point, at least one universal bracket according to the approach proposed herein being positioned and aligned in the elevator shaft as an intermediate bracket between the reference bracket and the pit assembly until the first guide of the intermediate bracket is aligned with the first plumb bob and the second guide of the intermediate bracket is aligned with the second plumb bob, and at least one rail of the rail system being mounted on the mounting points of the pit assembly, the intermediate bracket, and the reference bracket.

Possible features and advantages of embodiments of the invention can be considered, inter alia and without limiting the invention, to be based upon the concepts and findings described below.

A universal bracket for a rail system of an elevator installation can be used to install plumb bobs in a suitable position within an elevator shaft. Other components of the rail system can subsequently be aligned on the plumb bobs during installation of the rail system. A plumb bob can be understood in particular as a plumb line having a hanging plumb weight. The plumb weight ensures a vertical alignment of the plumb line. A plumb bob can be tensioned between two substantially arbitrary points and occupies a shortest connecting line between the points. This means that a plumb bob can also be tensioned in space at a structurally specified angle. For example, the plumb bob can compensate for up to four inches of lateral offset between the pit assembly and the reference bracket.

A universal bracket can be a structural component for a rail system of an elevator installation. The universal bracket can provide a mechanically resilient connection between rails of the rail system and an in particular load-bearing wall of an elevator shaft of a building. Preferably, a front wall of the shaft has the landing doors and forms the wall. The universal bracket can be dimensioned according to the load. In particular, the universal bracket can dissipate lateral forces that arise during operation of the elevator installation into the building. The universal bracket can be composed of a plurality of individual parts. The individual parts can, for example, be bent parts made from previously cut sheet metal. The individual parts can be screwed together. The individual parts can also be pinned or welded to one another. A central part of the universal bracket can be called the main support. The main support can have fastening points for connection to the wall or to a fastening means anchored in the wall. The fastening points can be designed to position the universal bracket laterally relative to the fastening means and to align an angle of the universal bracket in space. The mounting point can determine a position and location of at least one rail.

A pit assembly may be the lowest structural component of the rail system. A lower end of the elevator shaft can be referred to as a pit. The pit assembly can provide a mechanically strong connection between the rail and the pit. The pit assembly is preferably fastened to a particularly load-bearing floor of the elevator shaft or the pit. The pit assembly can also or alternatively be fastened to a particularly load-bearing wall of the elevator shaft or the pit. The pit assembly can be dimensioned in accordance with the load. In particular, the pit assembly can dissipate vertical forces that occur during operation of the elevator installation into the building or a foundation. The pit assembly can be composed of a plurality of individual parts. The individual parts can, for example, be bent parts made from previously cut sheet metal. The individual parts can be screwed together. The individual parts can also be pinned or welded to one another. A central part of the pit assembly may be referred to as a floor support. A part connected to the floor support may be referred to as a fastening support. The fastening support can have the fastening points for the plumb bobs on a side facing away from the floor support. The floor support can have fastening points for connection to the floor or to a fastening means anchored in the floor.

The main support can have two guides which are arranged in constructively predetermined positions relative to the mounting point and the fastening points to the building. The main support can have the guides on a side facing away from the mounting point. The relative positions can be identical for all universal brackets in a rail system. As a result, the universal brackets can be used for a plurality of applications, in particular as a reference bracket and as an intermediate bracket. A universal bracket based on the approach presented herein can be used as a replacement for the pit assembly. Based on the alignment thereof in the elevator shaft, a reference bracket firmly specifies a position and location of the other components of the rail system. An alignment of an intermediate bracket is adjusted relative to the alignment of the reference bracket.

The main support can have an upper chord and a lower chord aligned substantially parallel thereto and at least one web arranged between the upper chord and the lower chord. The guides can each be designed as a first notch on the upper chord and a second notch on the lower chord. The first notch and the second notch can, in particular, be arranged vertically one above the other when the universal bracket is aligned as intended. A notch can be a V-shaped recess in particular. The notch can be arranged on an edge of the main support. The main support may have a C-shaped cross section.

A plumb bob can be arranged or fastened in each of the guides. The plumb bobs can be temporarily, i.e., reversibly and detachably fastened. One end of the plumb bob can be attached to the guide. An opposite end of the plumb bob may be loaded with a weight. The plumb bob can be made up of a plurality of fibers, for example, or be designed as a wire.

The guides can be arranged on a wall side or on the side of the main support facing away from the mounting point. The universal bracket can be mounted using the guides on the wall side without touching the plumb bobs. The universal bracket can thus be easily inserted into the shaft, be roughly aligned, and then be pushed onto the threaded bolts to match the plumb bobs. Alternatively, the universal bracket can be inserted between the wall and the plumb bobs.

The universal bracket can have at least one rail support aligned transversely to the main support. The mounting point can be arranged on an end region of the rail support, which end region faces away from the main support. An opposite end region of the rail support may be connected to the main support. In particular, the universal bracket can have two rail supports, each having at least one mounting point and being connected to the main support at opposite end regions of the main support. The rail supports can be spaced apart far enough from one another such that a car of the elevator installation fits between the rail supports.

The reference bracket can be arranged below an uppermost shaft door sill of the elevator shaft. The intermediate bracket can be arranged below a shaft door sill of the elevator shaft, which sill lies below the uppermost shaft door sill. The universal bracket can have receptacles for a door guide of a shaft door of the elevator installation on an upper side. The door guide can be positioned and aligned in the same work step as the universal bracket itself. Due to the arrangement below the shaft door sill, lateral forces during loading and unloading of the elevator car can be dissipated directly into the building.

The reference bracket can be aligned using the plumb bobs in the guides to align the upper mounting points. A position of the reference bracket in the elevator shaft can be adjusted by bringing the plumb bobs in both guides into an intended position within the corresponding guide. Additional aids for alignment can thus be dispensed with.

The plumb bobs can be fastened to the fastening points of the pit assembly after the pit assembly is positioned and aligned. The plumb bobs can be subjected to traction. The plumb bobs can be tensioned taut. A connection at both ends can prevent the plumb bobs from swinging. This allows the intermediate brackets to be aligned without delays caused by swinging plumb bobs.

The main support can have two positioning and alignment devices which can be designed as recesses in the main support in the region of the guides. A distance between the main support and the wall can be adjusted via threaded bolts that can be arranged in the recesses and are anchored in the wall. An angular position of the main support relative to the wall can be adjusted via spherical caps that can be clamped on the edge of the recesses. The universal bracket can thus be positioned in all spatial directions and aligned in all spatial angles. The recesses can be arranged in particular on the web between the upper chord and the lower chord, which web is aligned substantially parallel to the wall.

An upper end of the plumb bobs can be hooked into the guides. The upper end can, for example, have a thickening similar to a bicycle brake cable, which thickening has larger dimensions than the guide. Accordingly, the guides can have a semi-closed shape in order to prevent the thickening from slipping out of the guide. For example, the guide can be designed as a slotted circle. A width of the slot corresponds approximately to a diameter of the plumb bob, while a diameter of the circle is smaller than a diameter of the thickening. The intermediate bracket can be positioned and aligned so that the plumb bobs each pass through a center point of the circle of their guides.

Alternatively, the upper end of the plumb bobs can be fastened to a fastening means of the elevator shaft. For example, the plumb bobs can each be fastened to an eyelet or screw fastened in a wall of the elevator shaft. The plumb bobs can also be fastened in the region of the floor lying above the reference bracket.

The upper end of the plumb bobs can be fastened to the reference bracket itself. For example, the plumb bobs can be looped around the reference bracket and knotted to itself or to the reference bracket.

It should be noted that some of the possible features and advantages of the invention are described herein with reference to different embodiments. A person skilled in the art will recognize that the features of the universal bracket, the pit assembly, the rail system, and the method may be suitably combined, adapted, or replaced in order to arrive at further embodiments of the invention.

Embodiments of the invention will be described below with reference to the accompanying drawings; neither the drawings nor the description should be interpreted as limiting the invention.

The drawings are merely schematic and not to scale. Like reference signs denote like or equivalent features in the various drawings.

DETAILED DESCRIPTION

Figure 1:
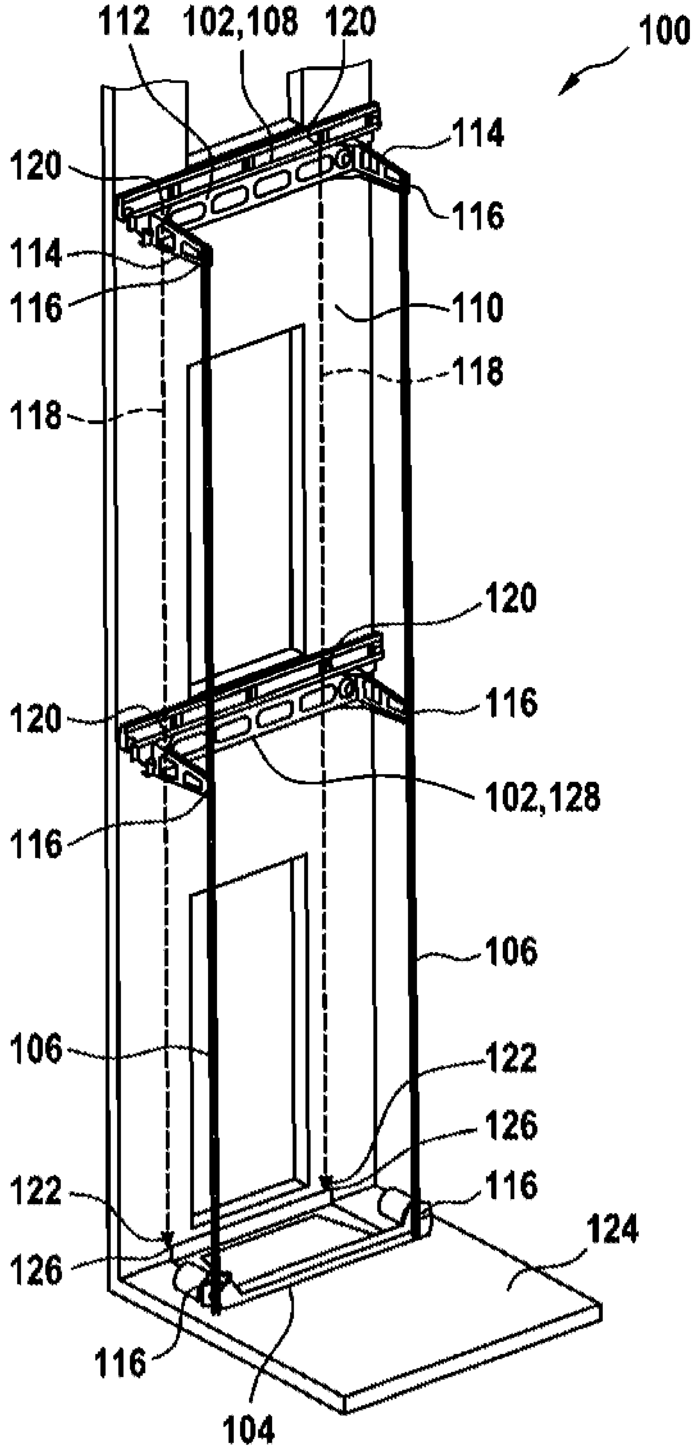
FIG. 1 shows a representation of a rail system of an elevator installation which is under construction and has universal brackets according to an embodiment.

FIG. 1 shows a representation of a rail system 100 which is under construction and has universal brackets 102 and a pit assembly 104 according to an embodiment. The rail system 100 is installed in an elevator shaft. The elevator shaft is only indicated in this case and extends over three floors of a building. Movable components of the elevator installation are later movably guided by the rail system 100 in a vertical direction. Rails 106 of the rail system 100 are mounted on the universal brackets 102 and on the pit assembly 104. The universal brackets 102 and pit assembly 104 dictate a later position of the rails 106 in the elevator shaft.

The rail system 100 is assembled from above. The uppermost of the universal brackets 102 is fastened as a reference bracket 108 to a wall 110 of the elevator shaft, and a main support 112 of the reference bracket 108 is aligned substantially parallel to the wall 110, so that rail supports 114 of the reference bracket 108 protrude away from the wall 110 horizontally into the elevator shaft. Mounting points 116 for mounting the rails of the rail system are arranged at the end regions of the rail supports 114.

In one embodiment, the reference bracket 108 is positioned and aligned horizontally on the wall 110 below a shaft door sill of the uppermost floor connected by the elevator shaft. A door guide of the reference bracket 108 is adjusted to a height of the shaft door sill. An angular position of the door guide is already predetermined by the alignment of the reference bracket 108.

Two plumb bobs 118 or plumb lines are then fastened to the reference bracket 108 and are each guided through a guide 120 of the reference bracket 108. At the ends of the plumb bobs 118, plumb weights 122 are fastened in this case. Due to the weight of the plumb weights 122, the plumb weights 122 and thus also the plumb bobs 118 hang vertically from the guides 120 of the reference bracket 108 downward into the elevator shaft.

The plumb bobs 118 are adjusted so that the plumb weights 122 hang just above a floor 124 of the elevator shaft. The pit assembly 104 is positioned on the floor 124 using plumb weights 122. The pit assembly 104 is moved on the floor 124 until fastening points 126 of the pit assembly 104 are aligned with the plumb weights 122 and the plumb bobs 118, respectively. After the alignment, the mounting points 116 of the pit assembly 104 are positioned according to the construction. In this position, the pit assembly 104 is fixed. To prevent the plumb weights 122 from swinging, the plumb bobs 118 can be fastened to the fastening points 126 of the pit assembly 104.

If the fastening points 126 of the pit assembly 104 are not alignable with the plumb weights 122, a distance of the reference bracket 108 from the wall 110 is adjusted. In this way, tolerances in the elevator shaft can be compensated for.

In an alternative embodiment, instead of the pit assembly 104, an additional universal bracket is arranged in the elevator shaft as a pit bracket. In contrast to the pit assembly 104 specially designed for this purpose, the pit bracket is not fastened to the floor 124 but rather to the wall 110 and is aligned horizontally using alignment devices on fastening means in the wall 110 until the guides of the pit bracket are aligned with the plumb weights 122 or plumb bobs 118. After the alignment, the mounting points of the pit bracket are arranged vertically below the mounting points 116 of the reference bracket 108.

Another universal bracket 102 is fastened to the wall 110 as an intermediate bracket 128 between the reference bracket 108 and the pit assembly 104. The intermediate bracket 128 is positioned below a shaft door sill of the middle floor. An angular position of the intermediate bracket 128 is adjusted until the intermediate bracket 128 is level and guides 120 of the intermediate bracket 128 are aligned with the plumb bobs 118. A door guide of the intermediate bracket 128 is adjusted to a height of the shaft door sill.

After all guides 120 have been aligned vertically one above the other via the plumb weights 122 or plumb bobs 118, the mounting points 116 for the rails 106 are also arranged vertically one above the other. Thus, the rails 106 can be mounted without further alignment. The plumb bobs 118 are removed after assembly of the rail system 100 and can be reused.

Figure 2:
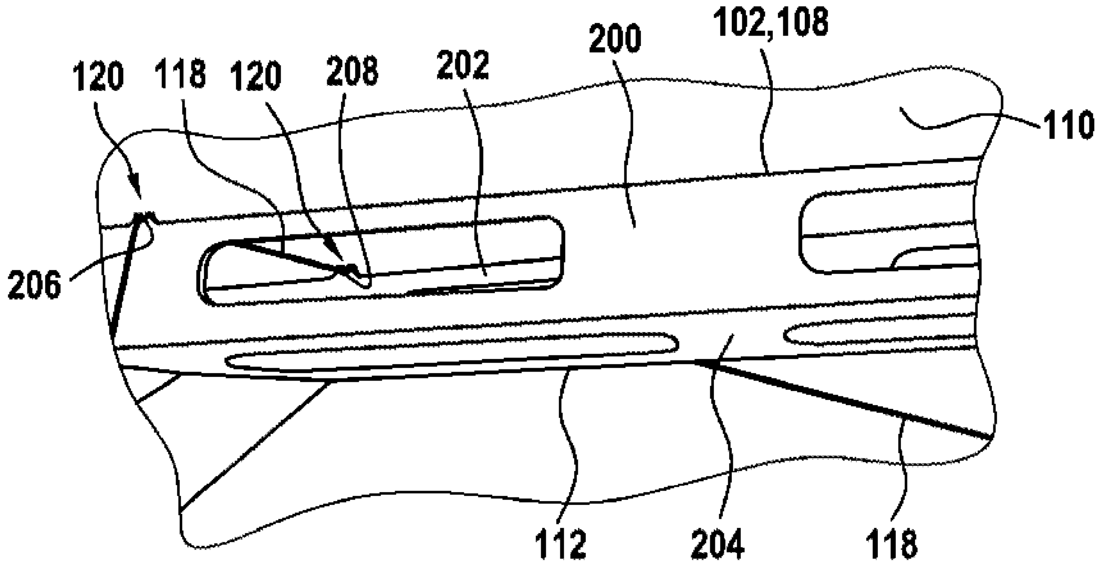
FIG. 2 shows a representation of a universal bracket used as a reference bracket according to an embodiment.

FIG. 2 shows a representation of a universal bracket 102 used as a reference bracket 108 according to an embodiment. The reference bracket 108 substantially corresponds to the reference bracket in FIG. 1. As in FIG. 1, the reference bracket 108 is arranged in front of the wall 110 of the elevator shaft and is aligned in an installation position. The main support 112 is designed in this case as a C-shaped profile having an upper chord 200, a lower chord 202, and a web 204 connecting the upper chord 200 and the lower chord 202. The "C" of the main support 112 is open to the wall 110. The upper chord 200, the lower chord 202, and the web 204 have recesses to save material.

In this case, one of the guides 120 is shown with one of the plumb bobs 118. The guide 120 has a first notch 206 in the upper chord 200 and a second notch 208 in the lower chord 202. The notches 206, 208 are arranged vertically one above the other when the universal bracket 102 is aligned in the intended position thereof in space. The notches 206, 208 are spaced apart by a width of the web 204. The plumb bob 118 is knotted in this case on the main support 112 in the region of the upper chord 200 and runs through the first notch 206 and the second notch 208 downwards in the direction of a lower end of the elevator shaft.

The notches 206, 208 are designed as V-shaped indents. The plumb bob 118 rests against a low point of the indents. In order not to weaken the main support 112, the notches 206, 208 are arranged outside of a loaded cross section of the main support 112. The notches 206, 208 are arranged in projections protruding from the upper chord 200 and the lower chord 202.

Figure 3:
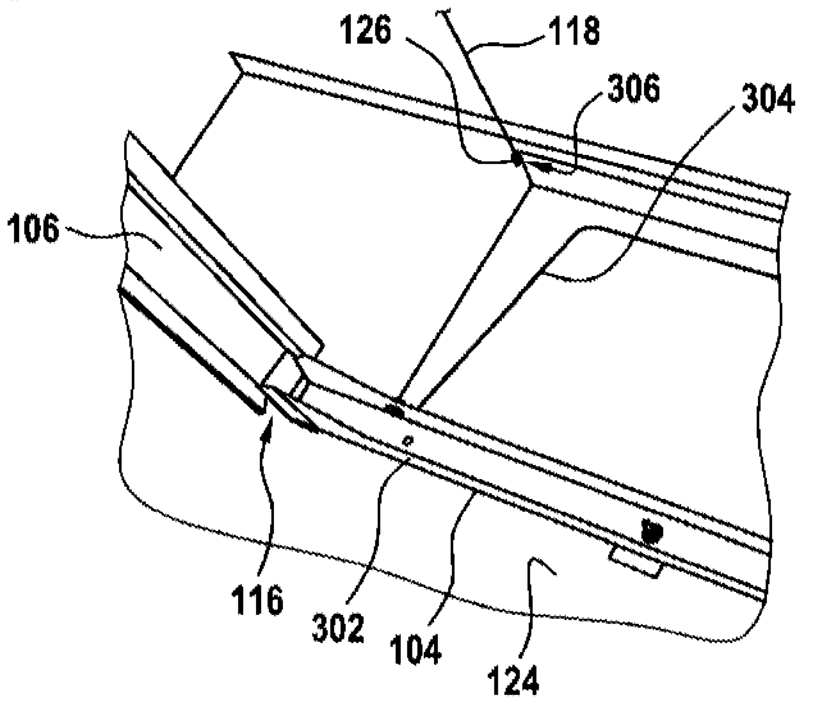
FIG. 3 shows a representation of a pit assembly according to an embodiment.

FIG. 3 shows a representation of a pit assembly 104 according to an embodiment. The pit assembly 104 substantially corresponds to the pit assembly in FIG. 1. A rail 106 of the rail system has been connected to one of the mounting points 116 of the pit assembly 104. The rail 106 is designed to guide a car of the elevator installation and a counterweight of the elevator installation vertically in the elevator shaft.

The pit assembly 104 has a floor support 302 and a fastening support 304. The floor support 302 has mounting points 116 at opposite ends. A length of the floor support 302 thus substantially corresponds to a clear width of the rail system. The fastening support 304 is fastened to the floor support 302 and has fastening points 126. The fastening support 304 positions the fastening points 126 in a fixed position relative to the mounting points 116. In positioning the pit assembly 104, the floor support 302 and fastening support 304 are slid back and forth until the fastening points 126 are aligned with the plumb weights or plumb bobs 118 that are hanging down. In this position, the pit assembly 104 is bolted to the floor 124. In this case the plumb bobs 118 are fastened to the fastening points 126 to tension them.

The floor support 302 is designed as an upwardly open U-profile. The fastening support 304 extends as a metal sheet along the floor 124 to a flange that is bent upwards, on which flange the fastening points 126 are arranged at the intended distance from one another and in the correct relative position to the mounting points 116. The fastening points 126 are arranged at opposite ends of the flange. The fastening support 304 has a large recess in the region of the floor 124 to reduce weight and save material.

The fastening points 126 of the pit assembly 104 are designed differently than the guides of the universal brackets. The fastening points 126 each have only one indent 306 through which the plumb bob 118 is guided. The indent 306 is aligned toward the floor 124 and clamps the plumb bob 118 when under tension. To secure the plumb bob 118 in the fastening point 126, the plumb bob 118 may be knotted to the fastening point 126.

Figure 4:
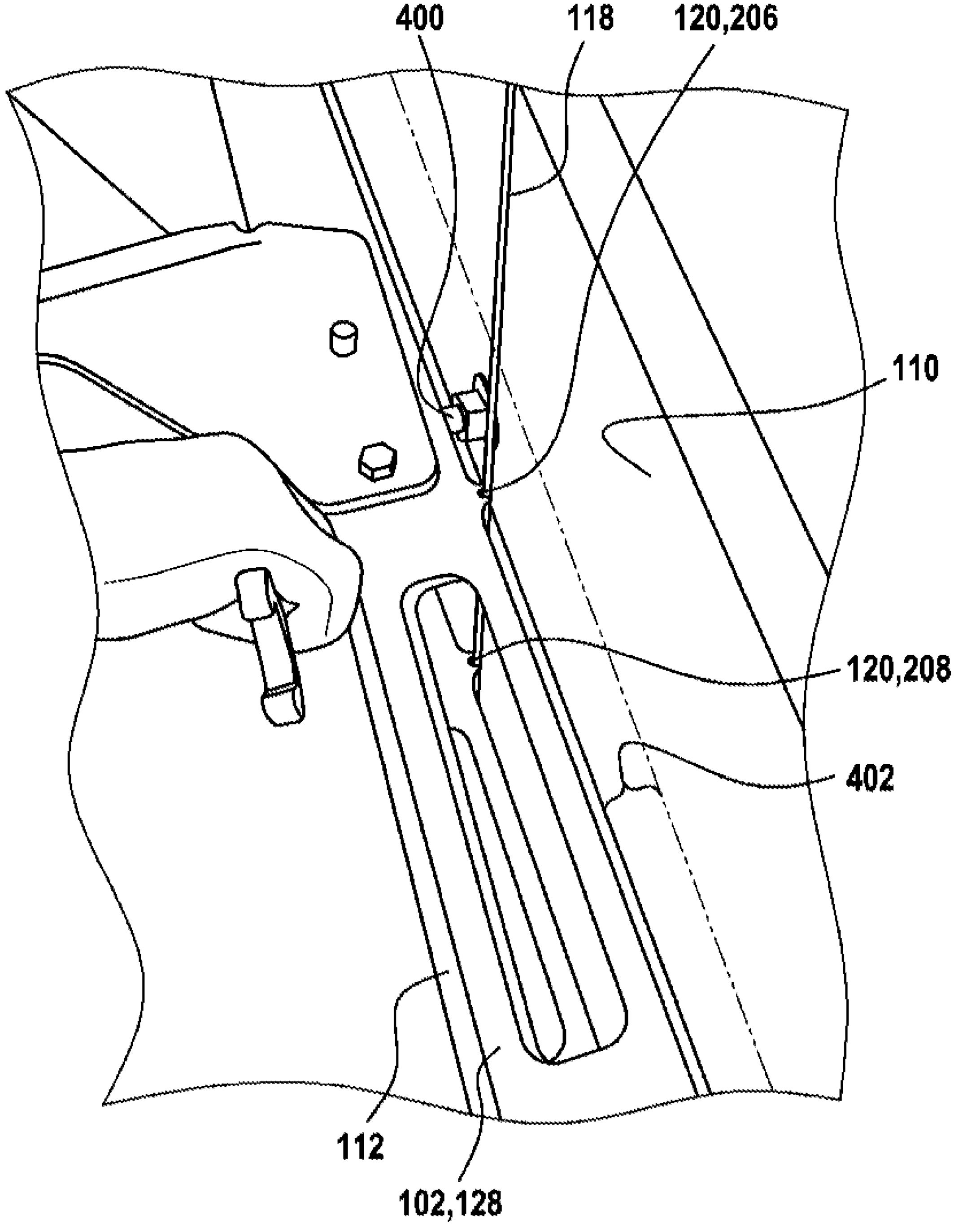
FIG. 4 shows a representation of an alignment of a universal bracket used as an intermediate bracket according to an embodiment.

FIG. 4 shows a representation of an alignment of a universal bracket 102 used as an intermediate bracket 128 according to an embodiment. The intermediate bracket 128 substantially corresponds to the universal bracket used as a reference bracket in FIG. 2. In this case, the reference bracket on an above-lying floor of the building and the pit assembly at the lower end of the elevator shaft are already aligned and fixed in their intended positions. Plumb bobs 118 are tensioned between the guides of the reference bracket and the fastening points of the pit assembly. The plumb bobs 118 run at a small distance from the wall 110 of the elevator shaft.

The intermediate bracket 128 is fastened to threaded bolts 400 anchored in the wall 110 and projecting substantially horizontally into the elevator shaft. The intermediate bracket 128 is slid onto the threaded bolts 400 and temporarily fixed using an alignment device per threaded bolt 400. The plumb bobs 118 run through a gap 402 between the main support 112 and the wall 110.

Stops are arranged on the threaded bolts 400, via which stops a distance of the main support 112 from the wall 110 and an angular position of the entire intermediate bracket 128 can be adjusted. The stops are adjusted so that the plumb bobs 118 pass precisely through both notches 206, 208 of the guides 120 of the intermediate bracket 128 without deflecting the plumb bobs 118 laterally. This adjusts both the distance and angular position of the intermediate bracket 128 such that the mounting points of the intermediate bracket 128 are arranged perpendicularly below the mounting points of the reference bracket. After the alignment, the intermediate bracket 128 is finally fixed on the threaded bolt 400 by tightening lock nuts. After tightening, the plumb bobs 118 run in a straight line, i.e. without kinks, through the guides 120. In this way, further intermediate brackets can be aligned with the plumb bobs 118.

Finally, it should be noted that terms such as "comprising," "having," etc. do not preclude other elements or steps, and terms such as "a" or "an" do not preclude a plurality. Furthermore, it should be noted that features or steps which have been described with reference to one of the above embodiments may also be used in combination with other features or steps of other embodiments described above.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A universal bracket for a rail system of an elevator installation, the universal bracket comprising:

a positionable and alignable main support being a structural component of the rail system and adapted to be fastened to a wall of an elevator shaft, wherein the main support has an upper chord and a lower chord aligned parallel to the upper chord;

a rail support arranged at an end region of the main support, the rail support protruding away from the wall horizontally into the elevator shaft when the main support is fastened to the wall, a mounting point for mounting a rail of the rail system arranged at an end region of the rail support facing away from the main support;

wherein when the main support is fastened to the wall and the rail is mounted at the mounting point, movable components of the elevator installation are movably guided by the rail during operation of the elevator installation;

wherein the main support has two guides that are inseparably connected to the main support to guide one plumb bob each, and wherein each of the guides is formed as a first notch on an edge of the upper chord and as a second notch on an edge of the lower chord; and wherein the mounting point and the guides are arranged in fixed positions relative to one another.

2. The universal bracket according to claim 1 wherein the guides are arranged on a side of the main support facing away from the mounting point.

3. The universal bracket according to claim 1 including the rail support being aligned transversely to the main support, and an opposite end region of the rail support being connected to the main support.

4. A rail system for an elevator installation, the rail system comprising:

a pit assembly including a floor support, a fastening support aligned transversely to the floor support and fastened directly to the floor support, wherein the floor support has a mounting point for mounting a rail of the rail system, the rail system including the pit assembly fixed at a floor of an elevator shaft and the rail mounted at the mounting point, wherein the fastening support has two fastening points connected inseparably to the fastening support to fasten one plumb bob each, and wherein the mounting point and the fastening points are arranged in fixed positions relative to one another;

two universal brackets according to claim 1, wherein one of the universal brackets is a reference bracket and another of the universal brackets is an intermediate bracket;

wherein each of the fastening points of the pit assembly is arranged under an associated one of the guides of the reference bracket, and each of the guides of the intermediate bracket is positioned between associated ones of the guides of the reference bracket and the fastening points of the pit assembly; and a rail mounted on the mounting points of the pit assembly, the intermediate bracket and the reference bracket.

5. A method for aligning a rail system of an elevator installation in an elevator shaft for the elevator installation, the method comprising the steps of:

providing the rail system according to claim 4;

arranging the pit assembly at a lower end of the elevator shaft;

arranging the reference bracket in a region of an upper end of the elevator shaft, the reference bracket being positioned and aligned on a wall of the elevator shaft;

passing a first plumb bob through a first of the guides of the reference bracket and lowering the first plumb bob to the lower end of the elevator shaft;

passing a second plumb bob through a second of the guides of the reference bracket and lowering the second plumb bob to the lower end of the elevator shaft;

positioning a first of the fastening points of the pit assembly relative to the first plumb bob and positioning a second of the fastening points of the pit assembly relative to the second plumb bob;

fastening the first plumb bob to the first fastening point and the second plumb bob to the second fastening point;

arranging the intermediate bracket in the elevator shaft, the intermediate bracket being positioned and aligned between the reference bracket and the pit assembly, wherein a first of the guides of the intermediate bracket is aligned with the first plumb bob and a second of the guides of the intermediate bracket is aligned with the second plumb bob; and mounting a rail of the rail system on the mounting points of the pit assembly, the intermediate bracket and the reference bracket.

6. The method according to claim 5 including at least one of positioning the reference bracket below an uppermost shaft door sill of the elevator shaft, and positioning the intermediate bracket below a shaft door sill of the elevator shaft.

7. The method according to claim 5 including hooking an upper end of each of the plumb bobs into the guides of the reference bracket.

8. The method according to claim 5 including fastening an upper end of each of the plumb bobs to a fastening means of the elevator shaft.

9. The method according to claim 5 including fastening an upper end of each of the plumb bobs to the reference bracket.

10. A universal bracket for a rail system of an elevator installation, the universal bracket comprising:

a positionable and alignable main support being a structural component of the rail system and adapted to be fastened to a wall of an elevator shaft;

a rail support arranged at an end region of the main support, the rail support protruding away from the wall horizontally into the elevator shaft when the main support is fastened to the wall, a mounting point for mounting a rail of the rail system arranged at an end region of the rail support facing away from the main support;

wherein when the main support is fastened to the wall and the rail is mounted at the mounting point, movable components of the elevator installation are movably guided by the rail during operation of the elevator installation;

wherein the main support has two guides that are inseparably connected to the main support to guide one plumb bob each;

wherein the main support has an upper chord and a lower chord aligned parallel to the upper chord, and wherein each of the guides is formed as a first notch on the upper chord and as a second notch on the lower chord; and wherein the mounting point and the guides are arranged in fixed positions relative to one another.

* * * * *